(12) United States Patent  
Nakano et al.

(10) Patent No.: US 9,917,336 B2
(45) Date of Patent: Mar. 13, 2018

(54) BATTERY SYSTEM

(71) Applicant: SANYO Electric Co., Ltd., Osaka (JP)

(72) Inventors: Shinya Nakano, Hyogo (JP);
Nobuyuki Ohsumi, Hyogo (JP);
Hideki Sakata, Hyogo (JP)

(73) Assignee: SANYO ELECTRIC CO., LTD.,
Osaka (JP)

( * ) Notice: Subject to any disclaimer, the term of this patent is extended or adjusted under 35 U.S.C. 154(b) by 296 days.

(21) Appl. No.: 14/765,352

(22) PCT Filed: Jan. 31, 2014

(86) PCT No.: PCT/JP2014/000510
§ 371 (c)(1),
(2) Date: Aug. 3, 2015

(87) PCT Pub. No.: WO2014/122905
PCT Pub. Date: Aug. 14, 2014

(65) Prior Publication Data
US 2015/0372354 A1 Dec. 24, 2015

(30) Foreign Application Priority Data

Feb. 6, 2013 (JP) .................................. 2013-021553

(51) Int. Cl.
H01M 10/48 (2006.01)
H01M 2/20 (2006.01)
B60L 11/18 (2006.01)

(52) U.S. Cl.
CPC ......... H01M 10/48 (2013.01); B60L 11/1879 (2013.01); H01M 2/206 (2013.01);
(Continued)

(58) Field of Classification Search
CPC .. H01M 10/48; H01M 10/486; H01M 10/482; H01M 2/206; H01M 2220/20
See application file for complete search history.

(56) References Cited

U.S. PATENT DOCUMENTS

2003/0122527 A1    7/2003  Yugo et al.
2012/0129024 A1*   5/2012  Marchio ............ H01M 2/1252
                                                         429/87
2013/0224564 A1    8/2013  Kim

FOREIGN PATENT DOCUMENTS

EP    568339      11/1993
JP    5-307950    11/1993
(Continued)

OTHER PUBLICATIONS

International Search Report of PCT application No. PCT/JP2014/000510 dated Mar. 11, 2014.

Primary Examiner — Jane Rhee
(74) Attorney, Agent, or Firm — Wenderoth, Lind & Ponack, L.L.P.

(57) ABSTRACT

A battery system comprises an assembled battery in which a plurality of battery cells are connected in series, a temperature sensor for detecting temperature of the battery cells of the assembled battery, and a voltage detecting line connected to a voltage detecting location of the battery cell. Further the battery system fixes the connecting terminal at the voltage detecting location. The connecting terminal fixes the temperature sensor in a thermally coupling state, and electrically connects the voltage detecting line.

12 Claims, 18 Drawing Sheets

(52) U.S. Cl.
 CPC ....... *H01M 10/482* (2013.01); *H01M 10/486* (2013.01); *B60L 2240/545* (2013.01); *B60L 2240/547* (2013.01); *H01M 2220/20* (2013.01); *Y02T 10/7005* (2013.01); *Y02T 10/705* (2013.01)

(56) References Cited

FOREIGN PATENT DOCUMENTS

| | | |
|---|---:|---:|
| JP | 5-095108 U | 12/1993 |
| JP | 2003-199256 | 7/2003 |
| JP | 2009-087583 | 4/2009 |
| JP | 2011-258413 | 12/2011 |
| JP | 2012-059500 | 3/2012 |
| JP | 2012-226969 | 11/2012 |
| JP | 2013-080619 | 5/2013 |
| JP | 2013-175432 | 9/2013 |
| WO | 2014/010419 | 1/2014 |

\* cited by examiner

BATTERY SYSTEM

This application is a U.S. national stage application of the PCT international application No. PCT/JP2014/000510

TECHNICAL FIELD

The present invention is related to a battery system having an assembled battery and a temperature sensor to detect temperature of the assembled battery.

BACKGROUND ART

A battery system having a high output voltage by connecting a plurality of battery cells in series is used for supplying power to electric equipment devices such as a motor or a starter of an electric vehicle, a car navigation, or an audio. In a state where the temperature or the voltage of the battery is out of the range of normal and safe usage, normal operation is not kept, and then there is a possibility that degradation of life, or the battery with smoking or burning might occur. Therefore, it is important for keeping a safety to monitor temperature or voltage of the battery. Additionally, in a safety monitoring of the battery system, when an abnormal state of the battery temperature is detected, it is necessary to immediately perform an operation such as turning off a relay connected to an output side. Therefore, it is also important to detect the abnormal state of the battery temperature. Thus, the battery is required to quickly detect the temperature or the voltage of the battery.

The battery system where the battery temperature is detected by the temperature sensor for detecting the temperature of the battery, has been developed. (refer to patent literature 1)

CITATION LIST

Patent Literature

Patent Literature 1: Japanese Laid-Open Patent Publication No. 2009-87583

SUMMARY OF THE INVENTION

In the battery system of patent literature 1, separators are disposed so as to sandwich the separators between prismatic shaped batteries, and a temperature sensor is coupled to the separator. In this battery system, it has a trouble to exactly dispose the temperature sensor at a most suitable specific location for detecting the temperature. Additionally, it is also difficult to dispose the temperature sensor at a fixed position without slippage of the temperature sensor in a long time.

The present disclosure is developed for the purpose of solving such drawbacks. One non-limiting and explanatory embodiment provides a battery system where the temperature sensor is simply and easily disposed also at a suitable location for detecting the battery temperature and further the temperature sensor is disposed at a fixed position without slippage of the temperature sensor in a long time.

A battery system of the present disclosure comprises an assembled battery in which a plurality of battery cells are connected in series, a voltage detecting line for detecting voltage of the battery cells constituting the assembled battery 10, and a temperature sensor for detecting temperature of at least one of the battery cells constituting the assembled battery. The assembled battery has a voltage detecting location to which the voltage of the battery cells detected by the voltage detecting line is applied, and the voltage detecting location is thermally coupled to an electrode terminal of at least one of the battery cells. The voltage detecting line has a connecting terminal provided at a tip thereof, and the connecting terminal is fixed at the voltage detecting location. The temperature sensor is provided at the connecting terminal, and is fixed to the connecting terminal in a thermally coupling state.

The vicinity of the electrode terminal of the battery cell is a current path outputted from the battery cell, and as heat generation inside the battery cell is conducted, the vicinity of the electrode terminal is apt to becomes comparatively high temperature. In the battery system of the present disclosure, as the temperature sensor is fixed to the connecting terminal of the voltage detecting line provided in the vicinity of the electrode terminal of the battery cell, the temperature sensor can be simply and easily disposed surely at a suitable location for detecting the temperature of the battery cell.

DESCRIPTION OF EMBODIMENTS

Figure 1:
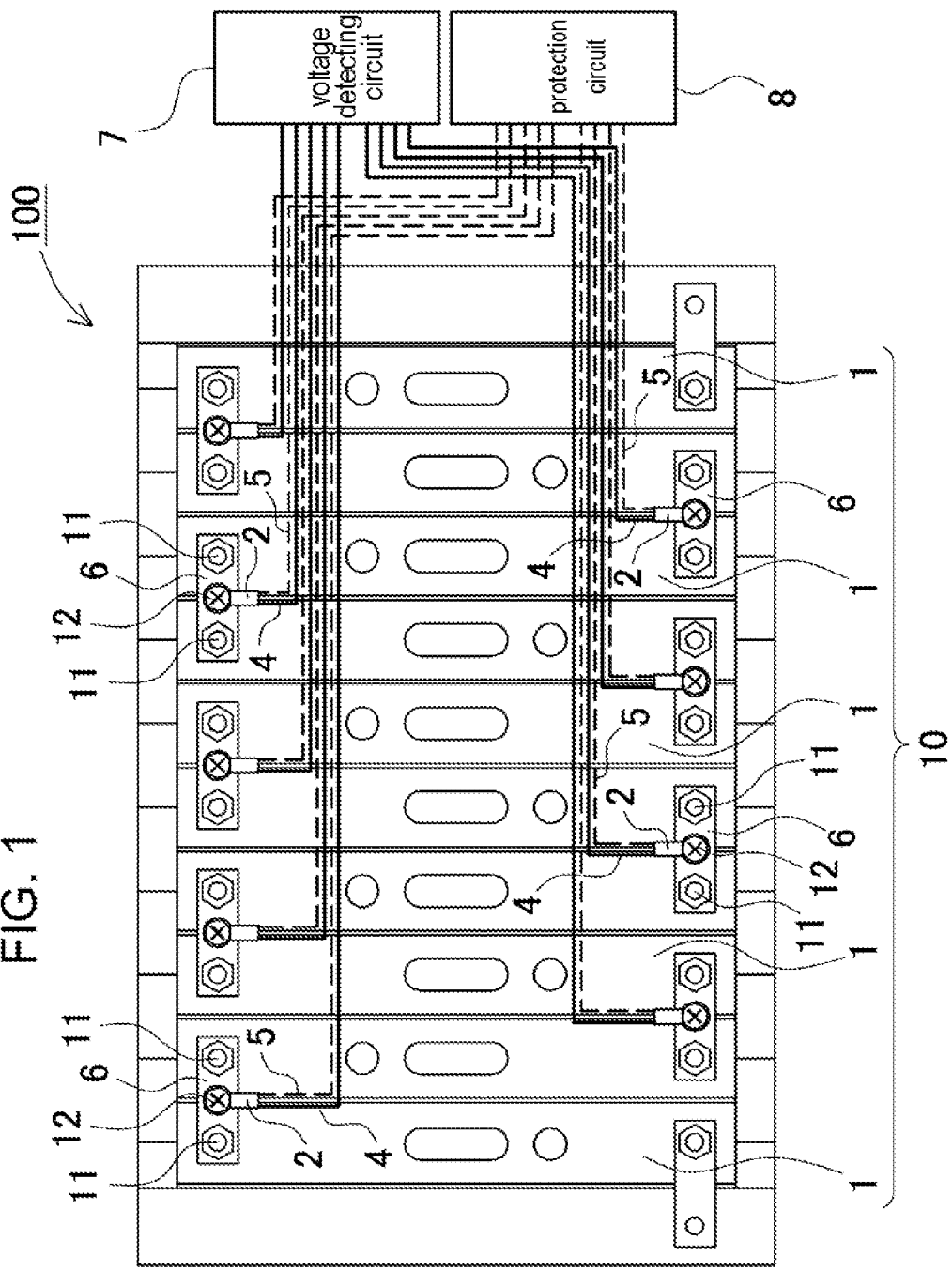
FIG. 1 is a schematic configuration view of a battery system related to one embodiment of the present invention.

Hereinafter, the embodiment of the present invention will be described referring to drawings. However, the following embodiments illustrate a battery system, an electric vehicle or a power storage device having this battery system which is aimed at embodying the technological concept of the present invention, and the present invention is not limited to the battery system, the electric vehicle or the power storage device having this battery system described below. However, the members illustrated in Claims are not limited to the members in the embodiments.

A battery system of the present disclosure comprises an assembled battery in which a plurality of battery cells are connected in series, a temperature sensor for detecting temperature at least one of the battery cells of the assembled battery, and a voltage detecting line connected to a voltage detecting location at least one of the battery cells. Further the battery system fixes the connecting terminal at the voltage detecting location. The connecting terminal fixes the temperature sensor in a thermally coupling state, and electrically connects the voltage detecting line.

The temperature sensor detects the temperature of the battery cell, and inputs to the protection circuit. Therefore, the temperature sensor is connected to the protection circuit through the lead wire. In a state where the temperature of the battery cells exceeds a predetermined temperature range, the protection circuit restricts or stops the charging and discharging current of the assembled battery.

Preferably, the temperature sensor is fixed to the connecting terminal in the thermally connecting state and an insulating state. In this battery system, as one end of the temperature sensor is not connected to the electrode of the battery cell, a direct current bias by the battery cell is not applied to the temperature sensor. Therefore, a circuit configuration where the temperature sensor is connected to the protection circuit can be simplified. Here, the one end of the temperature sensor can be also connected to the electrode.

The connecting terminal is fixed to the voltage detecting location of the battery cell. The voltage detecting location can be any one of the electrode terminal of the battery cell, the bus bar connected to the electrode terminal, and the lead connected to the electrode terminal or the bus bar. The connecting terminal is connected to the electrode terminal of the battery cell directly, or to the bus bar fixed to the electrode terminal of the batter cell, to the electrode terminal through the bus bar, or to the electrode through the lead connected to the electrode terminal or the bus bar. In the connecting terminal which is directly connected to the electrode terminal of the battery cell, a terminal portion at the tip thereof is a ring terminal, and the electrode terminal is inserted into the ring terminal. In this coupling structure, for example, a male screw is provided at the surface of the electrode terminal, and a nut is screwed in the male screw to fix the ring terminal. Further, a screw hole is provided at a tip of the electrode terminal, and a stopper screw inserted in the ring terminal is screwed in the screw hole, and then the connecting terminal is connected to the electrode terminal. Further, the connecting terminal fixed to the bus bar, fixes the ring terminal to the bus bar through a stopper screw. The stopper screw is inserted in the ring terminal, and the ring terminal is fixed by screw to the bus bar, and the connecting terminal is connected to the bus bar.

Here, in this disclosure, the electrode terminal of the battery cell means a terminal which is directly or indirectly connected to the positive or negative electrode terminal of the battery cell, and has a wide meaning which includes the positive or negative battery terminal penetrating the sealing plate of the battery cell, or an external terminal connected to the positive or negative battery terminal at the outside of the battery cell.

The temperature sensor can be fixed to the connecting terminal by any one of structures of adhering, crimping, and engaging. The temperature sensor fixed by adhering is fixed to the connecting terminal in a preferable thermal connecting state. In the fixing structure of crimping or engaging, it is simply and easily fixed to the connecting terminal surely without slippage of the temperature sensor.

Preferably, the connecting terminal is a crimp terminal. The crimp terminal is made of a metal board which is capable of fixing the voltage detecting line by crimping, namely a conductive metal board which is deformed in a crimping state by a crimp tool and held in a deformed state. The crimp terminal has a coupling portion which crimps and couples the voltage detecting line and fixes the temperature sensor, and a terminal portion connected to the electrode terminal. Preferably, the terminal portion is a ring terminal, and it can be surely fixed to the electrode terminal.

The coupling portion has a groove made by bending a metal board, and comprises a connecting portion of the voltage detecting line, and a fixing portion for fixing the temperature sensor. The connecting portion crimps and connects the voltage detecting line by bending side walls of both sides thereof by a crimp tool. The fixing portion disposes the temperature sensor in the groove, and fixes the temperature sensor by filling the groove with an adhesive. This connecting structure simply and easily connects the voltage detecting line surely to the connecting terminal, and then the temperature sensor can be fixed to the connecting terminal in an ideal thermal connecting state.

In the coupling portion, the connecting portion which crimps and connects the voltage detecting line, and the fixing portion which disposes and fixes the temperature sensor in the groove, are disposed in a longitudinal direction of the coupling portion. By this structure, both of the voltage detecting line and the temperature sensor are coupled in an ideal state. Especially, this crimp terminal can crimp and connect the voltage detecting line, and disposes and surely fixes the temperature sensor in the groove. Further, in the coupling portion, the connecting portion and the fixing portion are disposed on opposite sides of an upper surface and a back surface, or a same side, and the voltage detecting line and the temperature sensor can be fixed. As the coupling portion disposes the connecting portion and the fixing portion on the opposite sides of the upper surface and the back surface, the voltage detecting line can be surely coupled by crimping, while the temperature sensor is protected from deformation force at the time of crimping the temperature sensor. Further, the coupling portion which disposes the connecting portion and the fixing portion on the same side, can simplify the structure of the crimp terminal, and the crimp terminals can be inexpensively mass-produced.

In the crimp terminal which disposes the connecting portion and the fixing portion in the longitudinal direction, the terminal portion is disposed closer to the fixing portion than the connecting portion. The temperature sensor can quickly and exactly detect the temperature of the battery cell 1. It is a reason why the temperature sensor is disposed close to the electrode terminal.

The crimp terminal of the connecting terminal has the ring terminal as the terminal portion, and couples the fixing portion and the connecting portion separately in the circumferential direction at the periphery of the ring terminal. Preferably, the crimp terminal disposes the fixing portion and the connecting portion separately in the opposite locations at the periphery of the ring terminal, namely linearly. In this crimp terminal, deformation force crimping the voltage detecting line is not applied to the temperature sensor, and the voltage detecting line and the temperature sensor can be ideally fixed. Further, both of the temperature sensor and the voltage detecting line can be disposed close to the electrode terminal, and the temperature sensor can quickly and exactly detect the temperature of the battery cell.

In the connecting portion of the connecting terminal, the voltage detecting line can be connected by welding or soldering. This connecting terminal is made of a metal board, and the connecting portion and the fixing portion are connected to the terminal portion. The temperature sensor can be also connected to the fixing portion by engaging structure of the following. A coupling hole is provided at the fixing portion, and a coupling rod for inserting in the coupling hole is provided at the temperature sensor, and the temperature sensor is fixed to the fixing portion by inserting the coupling rod in the coupling hole. The connecting terminal which connects the voltage detecting line by welding or soldering can stably couple the voltage detecting line in a long time. Further, the structure where the temperature sensor is fixed to the fixing portion by inserting the coupling rod in the coupling hole, can simply fix the temperature sensor at a predetermined position.

The above battery system is installed in electric vehicles, and can supply power to a motor driving the vehicle. The battery system is installed in vehicles, and can supply power to electric equipment devices for a vehicle in parallel. Further, the above battery system is installed in electric power storage devices for storing natural energy or midnight electric power energy.

More concrete embodiments are explained below in detail, based on figures.

By using the battery cell 1 of a prismatic battery, the battery system 100 of FIG. 1 has the plurality of the prismatic batteries stacked in the longitudinal direction to configure the assembled battery 10. The battery cells 1 are connected in series through the bus bars 6. The connecting terminals 2 are fixed to the voltage detecting locations of the battery cells 1. One end of the voltage detecting line 4 is connected to this connecting terminal 2. The other end of the voltage detecting line 4 is connected to a voltage detecting circuit 7, and then voltage of each of the battery cells 1 is inputted to the voltage detecting line 7.

The voltage detecting circuit 7 detects the voltage of each of the battery cells 1, and suppresses or stops charging or discharging current, when the voltage of the battery cell 1 becomes lower or higher than predetermined voltages. For example, the voltage detecting circuit 7 restricts or stops the charging current of the assembled battery 10 when the voltage of the charged battery cell 1 becomes more than the maximum voltage. Also, the voltage detecting circuit 7 restricts or stops the discharging current of the assembled battery 10 when the voltage of the discharging battery cell 1 becomes less than the minimum voltage. In this way, over charge or over discharge of the battery cell 1 can be prevented.

Here, the voltage detecting circuit 7 does not necessarily detect the voltages of all of the battery cells. It can be configured that voltages of a module or the assembled voltage 10 where the plural battery cells 1 are connected in series are detected.

Further, the battery system 100 of FIG. 1 has the temperature sensor 3 to detect temperature of the battery cells 1. The temperature sensor 3 is connected to the connecting terminal 2 in a thermally coupling state to detect the temperature of the battery cells 1. The connecting terminal 2 electrically connects the voltage detecting line 4 to the electrode terminals 11 of the battery cells 1, and then couples the temperature sensor 3 to the electrode terminals 11 of the battery cells 1 in a thermally coupling state. The connecting terminal 2 is made of a metal board, and has excellent electric conductivity and thermal conductivity characteristics. Therefore, the connecting terminal 2 electrically connects the voltage detecting line 4 to the electrode terminals 11 in a state of low resistance, and couples the temperature sensor 3 in a state of quickly detecting the battery temperature. The temperature sensor 3 detects the temperature of the battery cells 1 through the connecting terminal 2.

The temperature sensor 3 detects the temperature of the battery cells 1, and inputs to the protection circuit 8. Therefore, the temperature sensor 3 is connected to the protection circuit 8 through the lead wire 5. In a state where the temperature of the battery cells 1 exceeds a predetermined temperature range, the protection circuit 8 restricts or stops the charging and discharging current of the assembled battery 10.

Figure 2:
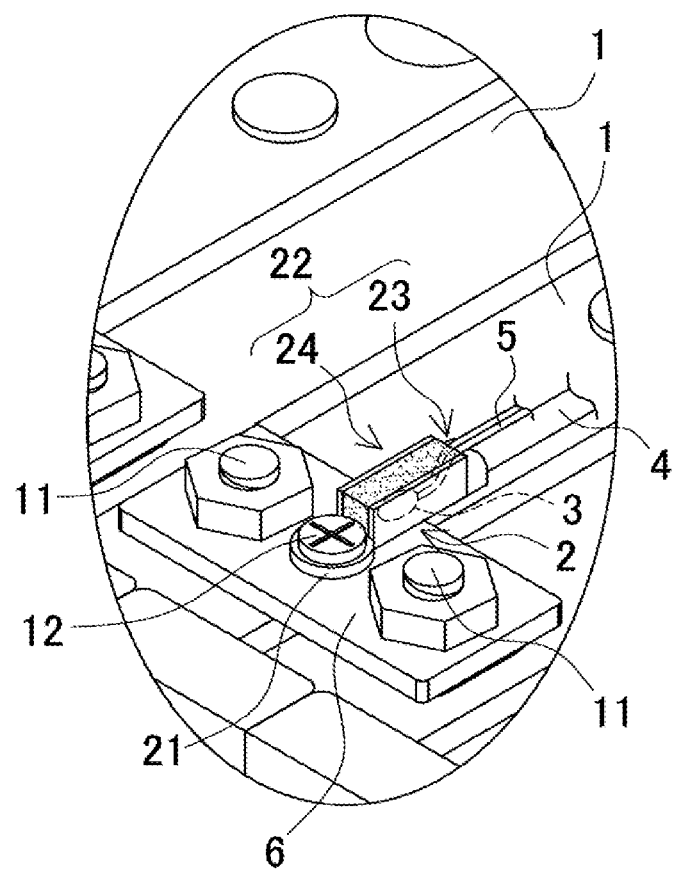
FIG. 2 is an enlarged perspective view showing a connecting state in the battery system shown in FIG. 1.
Figure 3:
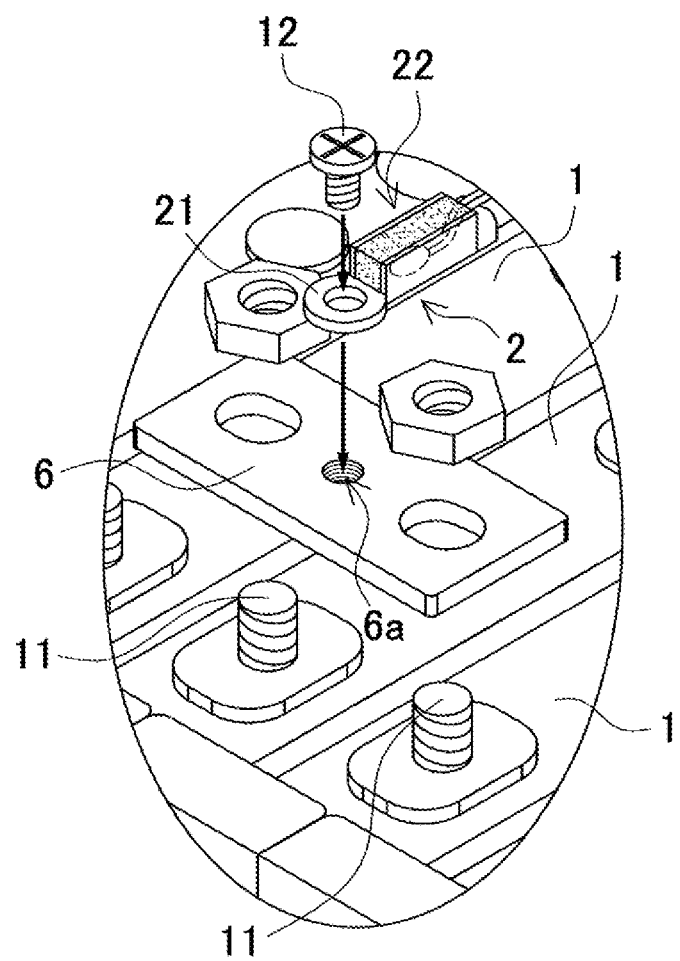
FIG. 3 is an exploded perspective view showing a connecting state in the battery system shown in FIG. 2.
Figure 4:
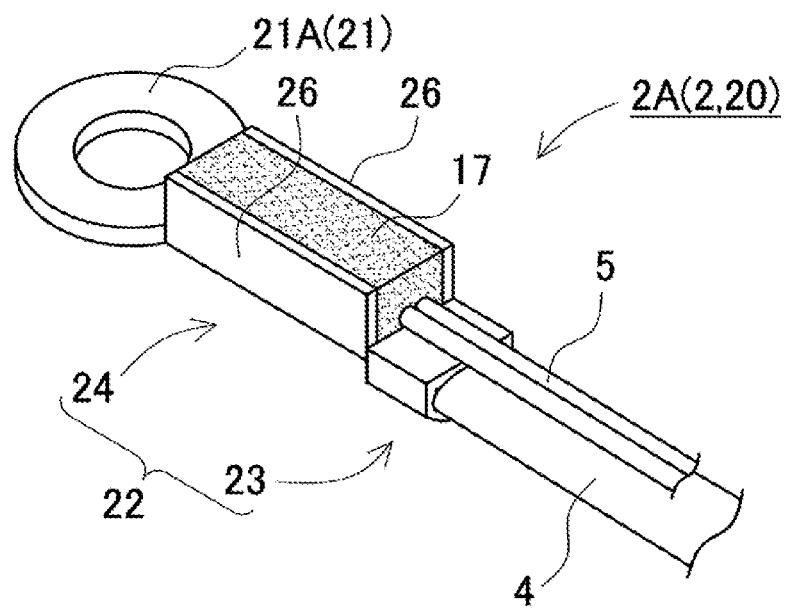
FIG. 4 is a perspective view showing one example of a connecting terminal.

As shown in FIG. 2 and FIG. 3, the battery system 100 of FIG. 1 has the bus bars 6 fixed to the electrode terminals 11 of the battery cells 1 as the voltage detecting locations of the battery cells 1. Therefore, the temperature sensor 3 detects the temperature of the battery cell 1. Here, the battery system can have the electrode terminal 11 of the battery cell 1 as the voltage detecting location, namely can directly connect the connecting terminal 2 to the electrode terminal 11. Further, the battery system, not shown in figures, may connect various electric parts, such as, for example, a shunt resistor for detecting current, a fuse, or a relay for cutting off between the electrode terminals. Therefore, a lead or the like connecting these electric parts between the electrode terminals is provided, and the connecting terminal as the voltage detecting location can be connected to the lead. Thus, the battery system can have the lead connected to the electrode terminal or the bus bar as the voltage detecting location.

The battery system 100 has the electrode terminal 11 of the battery cell 1 which penetrates a sealing plate of the battery cells 1. Thus, the temperature inside the battery cell is conducted by the electrode terminal 11 to the temperature sensor 3 in a preferable state. Then, the temperature sensor 3 quickly detects the battery temperature through the connecting terminal 2 and the bus bar 6. However, the electrode terminal does not necessarily have the structure where the electrode terminal penetrates the sealed plate of the battery cell, and then an electrode terminal as an external terminal, not shown, can be connected to a positive or negative battery terminal outside the battery cell. As such an external terminal, for example, a rod or a bolt which is coupled to the battery terminal penetrating the sealed plate through a lead member at the surface of the sealed plate, can be used. Also in the connecting terminal of the external terminal, the temperature inside the battery can be efficiently conducted to the temperature sensor.

The connecting terminal 2 is coupled to the temperature sensor 3 in a thermally coupled and insulated state, and is coupled to the voltage detecting line 4 in an electrically connected state. The connecting terminal 2A shown in FIG. 4 to FIG. 7 is the crimp terminal 20. The crimp terminal 20 is made of a metal board which can crimp and fix the voltage detecting line 4. In the crimp terminal 20 shown in these figures, the coupling portion 22 connects the voltage connecting line 4 to the terminal portion 21 fixed to the electrode terminal 11, and fixes the temperature sensor 3. The terminal portion 21 is a ring terminal 21A made by cutting a metal board in a ring shape, and the coupling portion 22 has a groove shape by bending a metal board. This crimp terminal 20 disposes the terminal portion 21 and the bottom surface of the fixing portion 24 in the same plane. As shown in FIG. 2 and FIG. 3, the ring terminal 21A is fixed to the bus bar 6 by a stopper screw 12. The stopper screw 12 is inserted into the ring terminal 21A, and is screwed into a screw hole 6a, and fixes the terminal portion 21 to the bus bar 6. Here, the bus bar does not necessarily have the screw hole. Instead, a through hole is opened at a fixing location of the connecting terminal in the bus bar, and a tip of a stopper screw inserted into the through hole is screwed into a nut at the rear surface of the bus bar, and then the connecting terminal can be fixed by the screw. Further, the connecting terminal can be welded to the bus bar. In the case of welding the bus bar to the connecting terminal, it is not necessary to provide a hole in the bus bar or the connecting terminal for fixing the connecting terminal.

The coupling portion 22 disposes the fixing portion 24 fixing the temperature sensor 3 and the connecting portion 23 connecting the voltage detecting line 4 in the longitudinal direction, and disposes the fixing portion 24 at the near side to the terminal portion 21. The connecting terminal 2A disposing the fixing portion 24 at the terminal portion 21 side, can dispose the temperature sensor 3 close to the electrode terminal 11, and then the temperature sensor 3 can quickly detect the temperature of the battery cell 1.

The fixing portion 24 has a groove shape, and the temperature sensor 3 is disposed in the groove 27, and the groove 27 is filled up with an adhesive 17. The lead wire 5 of the temperature sensor 3 is led outside from the fixing portion 24. The adhesive 17 has thermal conductivity properties and insulating properties, and by this, the temperature sensor 3 is fixed to the fixing portion 24 in a thermally coupling and insulating state. As such an adhesive, for example, epoxy resin or the like can be used. Especially, the adhesive of epoxy resin has a strong adhesive strength to a metal, and its hardening speed is high, and then while working efficiency can be improved, it is surely adhered. Here, the adhesive other than epoxy resin can be used. Preferably, the adhesive can be mixed with members having high thermal conductivity. As such a member for mixing, for example, powder such as silica, alumina, or the like can be used.

Figure 5:
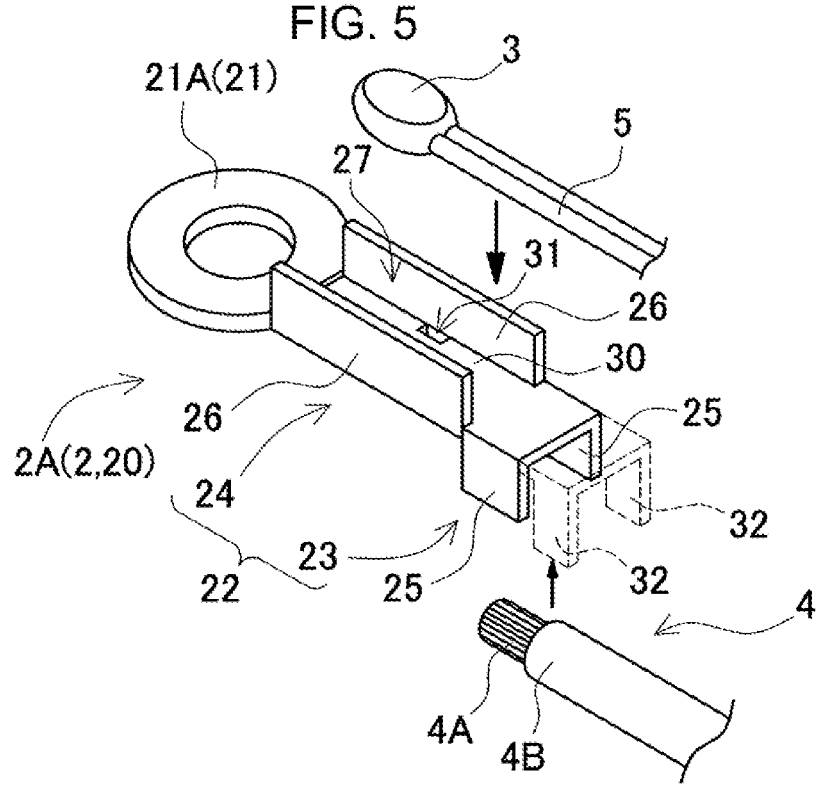
FIG. 5 is an exploded perspective view of the connecting terminal shown in FIG. 4.
Figure 6:
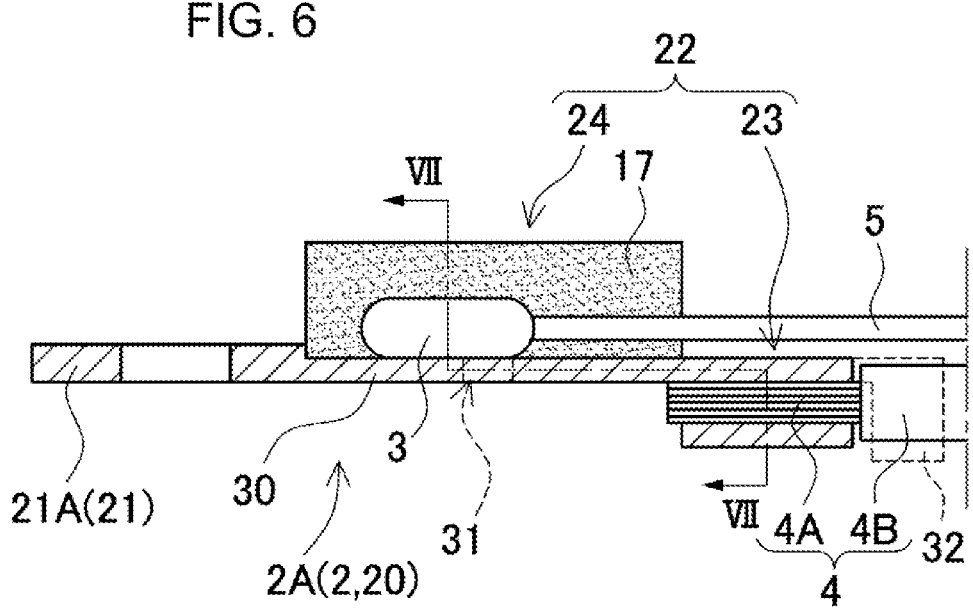
FIG. 6 is a vertical longitudinal sectional view of the connecting terminal shown in FIG. 4.
Figure 7:
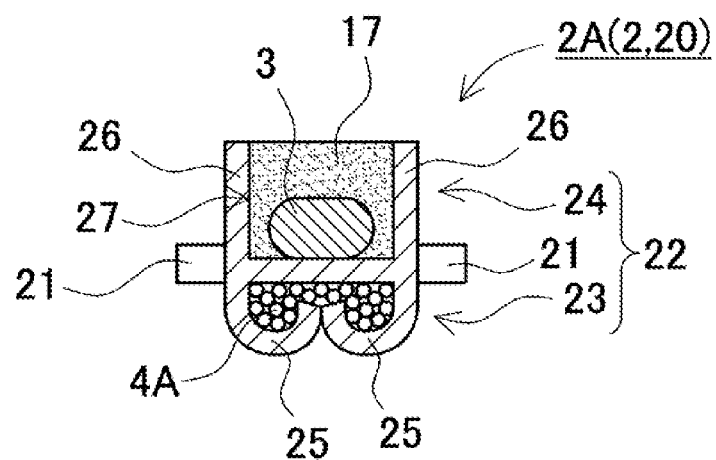
FIG. 7 is a sectional view along a line VII-VII of the connecting terminal shown in FIG. 6.

The fixing portion 24 shown in FIG. 5 and FIG. 6 has an air releasing hole 31 at the low end in the middle portion of the side wall 26 at the bottom surface of the groove 27. By this structure, when the adhesive 17 is injected in the groove 27, the adhesive 17 can be smoothly injected while air is released through the air releasing hole 31. The air releasing hole 31 shown in the figure is opened in the middle portion at the boundary between the bottom surface 30 and the side wall 26 of the groove 27, but the air releasing holes can be provided in the middle portion or the like at the bottom surface or the side wall. The opening area, the number, and the location of the releasing holes 31 are decided considering a viscosity and a hardening speed of the filling adhesive 17. However, the air releasing hole is not necessarily provided.

The connecting portion 23 disposes a core wire 4A of the voltage detecting line 4 inside the groove, and both side walls 25 of the groove crimp the core wire 4A by bending both side walls 25, and then voltage detecting line 4 is electrically connected. The connecting terminal 2A shown in the figures disposes the fixing portion 24 and the connecting portion 23 respectively on the upper surface and the back surface of the coupling portion 22 (on the opposite sides in the figure). In FIG. 4 to FIG. 7, the fixing portion 24 is disposed at the upper side, and the connecting portion 23 is disposed at the back side. The coupling portion 22 disposes the side walls 26 of the fixing portion 24 at the upper side and the side walls 25 of the connecting portion 23 at the back side of the bottom surface. The connecting terminal 2A disposes the temperature sensor 3 in the groove 27 of the fixing portion 24 having the groove shape opening upward, and this portion is filled with the adhesive 17, and the temperature sensor 3 is fixed by hardening the adhesive 17. Further, the connecting terminal 2A disposes the core wire 4A in the connecting portion 23 having the groove shape opening downward, and both side walls 25 are deformed and bent by a crimp tool (not shown), and the voltage detecting line 4 is crimped and fixed. As this crimp terminal 20 disposes on the opposite sides and separates the side walls 25 of the connecting portion 23 and the side walls 26 of the fixing portion 24, excessive force is not applied to the temperature sensor 3 in the process where the voltage detecting line 4 is connected through deforming the side walls 25 of the connecting portion 23 by the crimp tool. Thus, the temperature sensor 3 can be fixed to the fixing portion 24 while being protected. Further, by disposing those, the lead wire 5 connected to the temperature sensor 3 and the connecting portion 23 do not interfere with each other.

Additionally, as shown by a dotted line in FIG. 5 and FIG. 6, the connecting portion 23 can have second side walls 32 for crimping an insulating coating portion 4B of the voltage detecting line 4 outside the side walls 25. This connecting portion 23 extends the bottom surface 30 of the connecting portion 23 in the direction where the voltage detecting line 4 is led out, and provides the second side walls 32 at both sides of this extended portion to form a groove shape. This connecting portion 23 deforms the side walls 25, and crimps and fixes the core wire 4A of the voltage detecting line 4, and deforms the second walls 32, and crimps and fixes the insulating coating portion 4B. In this structure, as the insulating coating portion 4B of the voltage detecting line 4 is held by the connecting portion 23, this structure effectively prevents applying mechanical force to the core wire 4A, and disconnection of lines or contact failure is prevented, and then it can be safely used in a long time.

Figure 8:
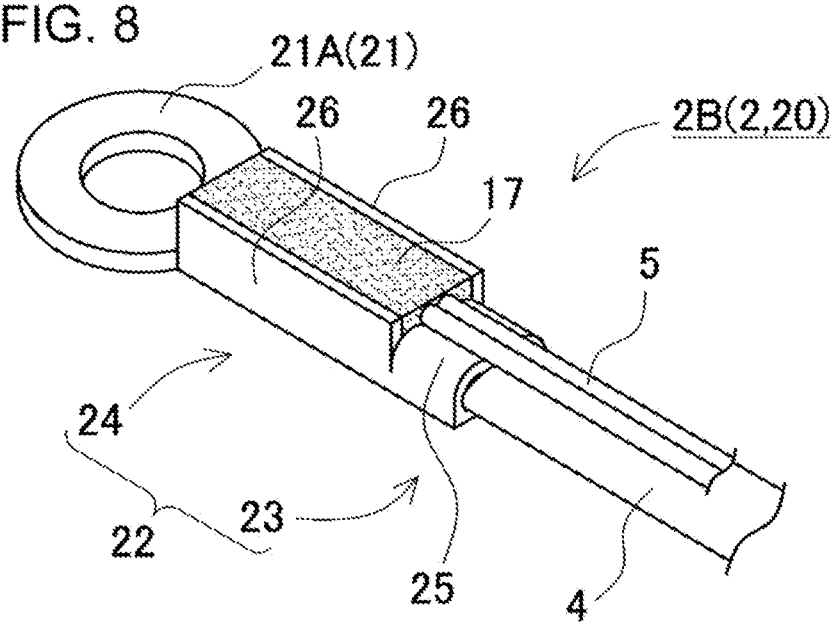
FIG. 8 is a perspective view showing another example of a connecting terminal.
Figure 9:
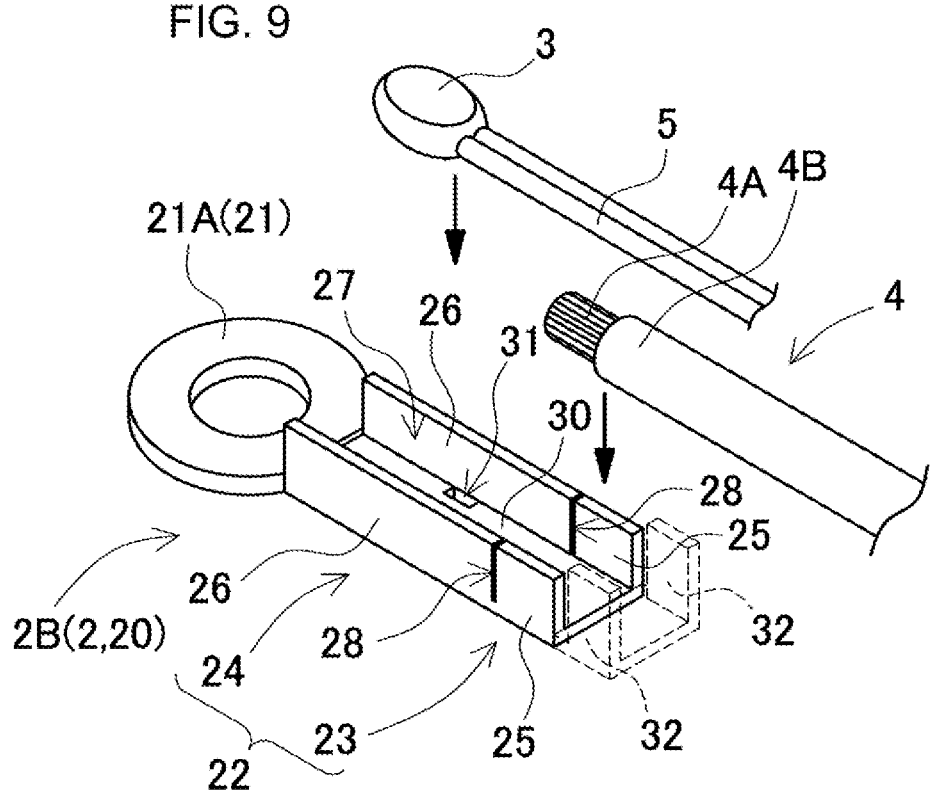
FIG. 9 is an exploded perspective view of the connecting terminal shown in FIG. 8.
Figure 10:
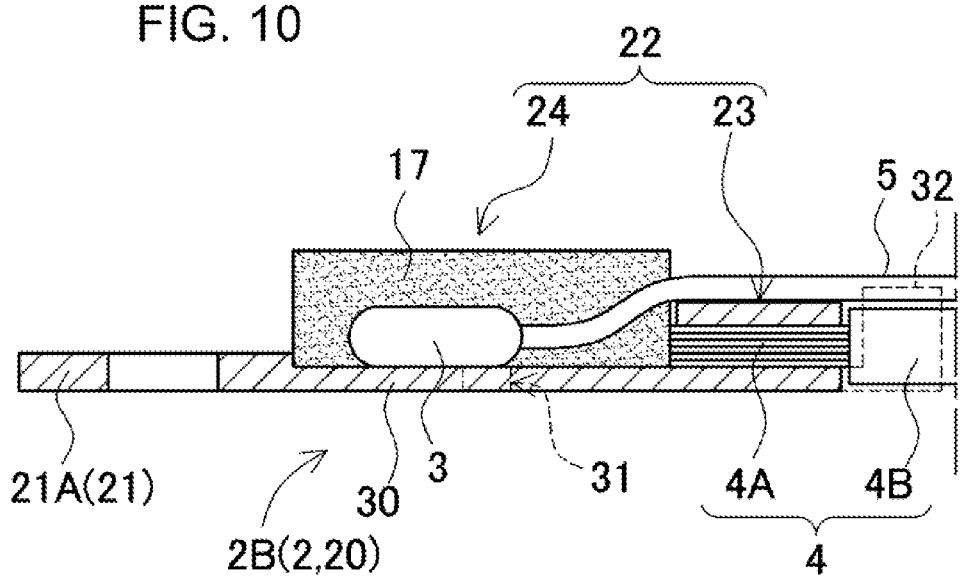
FIG. 10 is a vertical longitudinal sectional view of the connecting terminal shown in FIG. 8.

The connecting terminal 2B shown in FIG. 8 to FIG. 10 disposes the fixing portion 24 and the connecting portion 23 on the same side, namely on the upper surface in the figures. The side walls 26 of the fixing portion 24 and the side walls 25 of the connecting portion 23 are separated from each other by providing a cutting line 28 at the boundary therebetween. As the coupling portion 22 separates the side walls 26 of the fixing portion 24 and the side walls 25 of the connecting portion 23 from each other by the cutting line 28, excessive force is not applied to the temperature sensor 3 without the side wall 26 of the fixing portion 24 deformed in a state where the side walls 25 of the connecting portion 23 are crimped. Additionally, as shown by a dotted line in FIG. 9 and FIG. 10, also in this connecting terminal, second side walls 32 for crimping the insulating coating portion 4B of the voltage detecting line 4 can be provided outside the side walls 25. This connecting portion 23 also deforms the side walls 25, and crimps and fixes the core wire 4A of the voltage detecting line 4, and deforms the second walls 32, and crimps and fixes the insulating coating portion 4B.

Figure 11:
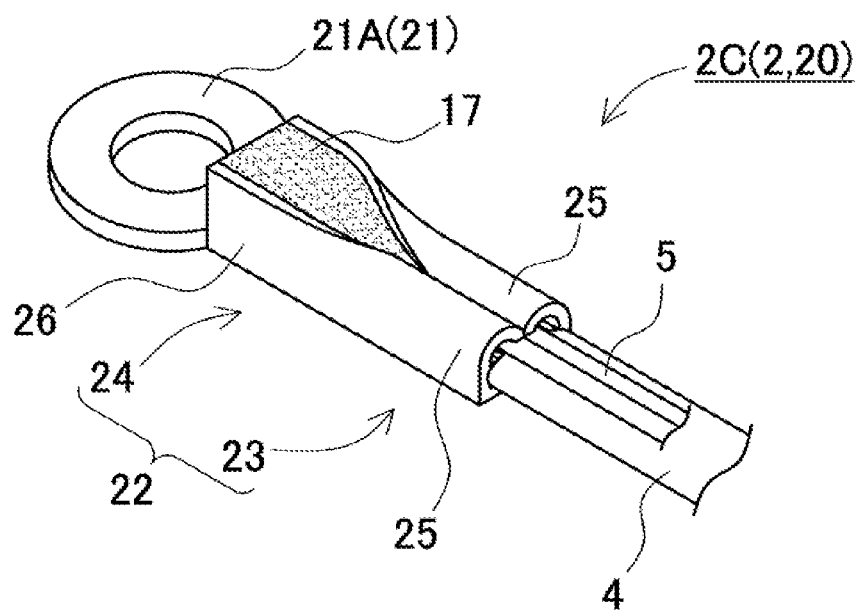
FIG. 11 is a perspective view showing another example of a connecting terminal.
Figure 12:
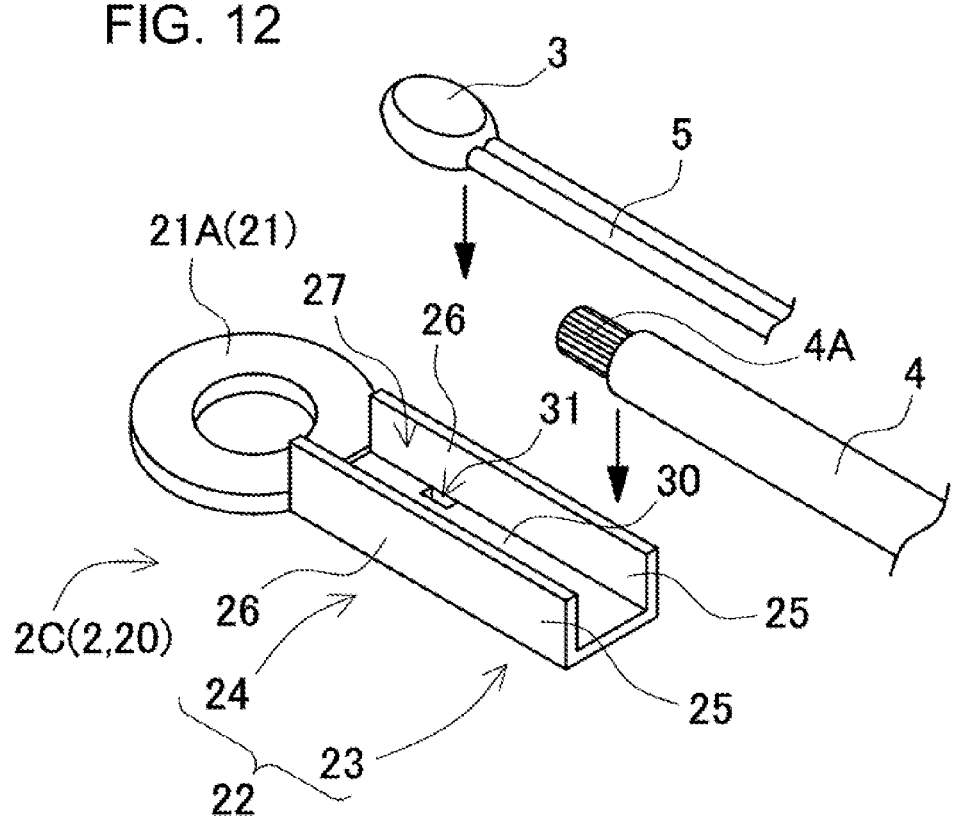
FIG. 12 is an exploded perspective view of the connecting terminal shown in FIG. 11.
Figure 13:
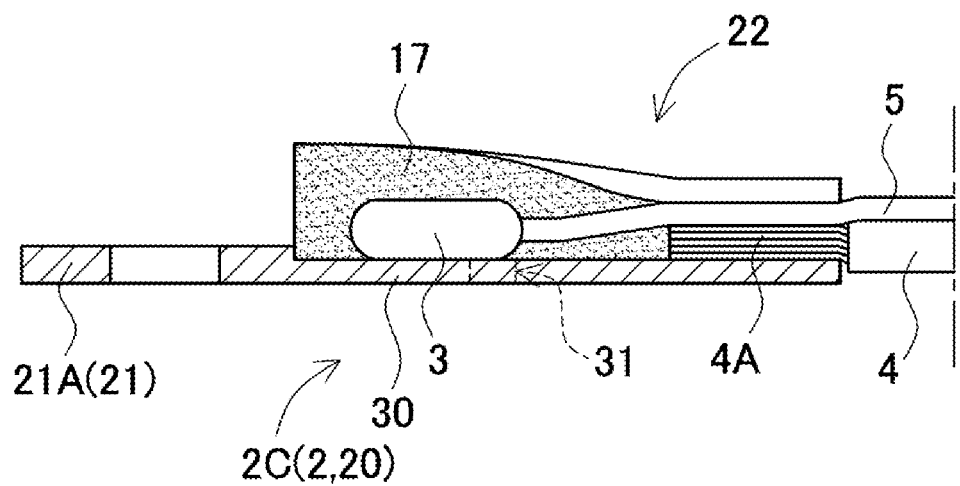
FIG. 13 is a vertical longitudinal sectional view of the connecting terminal shown in FIG. 11.

However, as shown in FIG. 11 to FIG. 13, the side walls 25 of the connecting portion 23 and the side walls 26 of the fixing portion 24 can be continuously formed without the cutting line. In this crimp terminal 20, when the side walls 25 of the connecting portion 23 for crimping is deformed, the side walls 26 of the fixing portion 24 continuously formed to this are deformed at the boundary to the connecting portion 23. The deformed side walls 26 make the opening portion of the groove shape narrow, and prevent slippage of the temperature sensor 3. This connecting terminal 2C temporarily fixes the lead wire 5 of the temperature sensor 3 by the side walls 25 of the connecting portion 23 for fixing the voltage detecting line 4. The temperature sensor 3 temporarily fixed by the side walls 25 of the connecting portion 23 uses the lead wire 5 of which the surface is covered with insulating coating. The lead wire 5 is insulated from the connecting portion 23 by the insulating coating, and is led outside. In the process where the lead wire 5 of the temperature sensor 3 is temporarily fixed by the side walls 25 of the connecting portion 23, the groove 27 is filled with the adhesive 17 to fix the temperature sensor 3, in a state where the lead wire 5 is temporarily fixed without the groove 27 of the fixing portion 24 filled with the adhesive 17.

Figure 14:
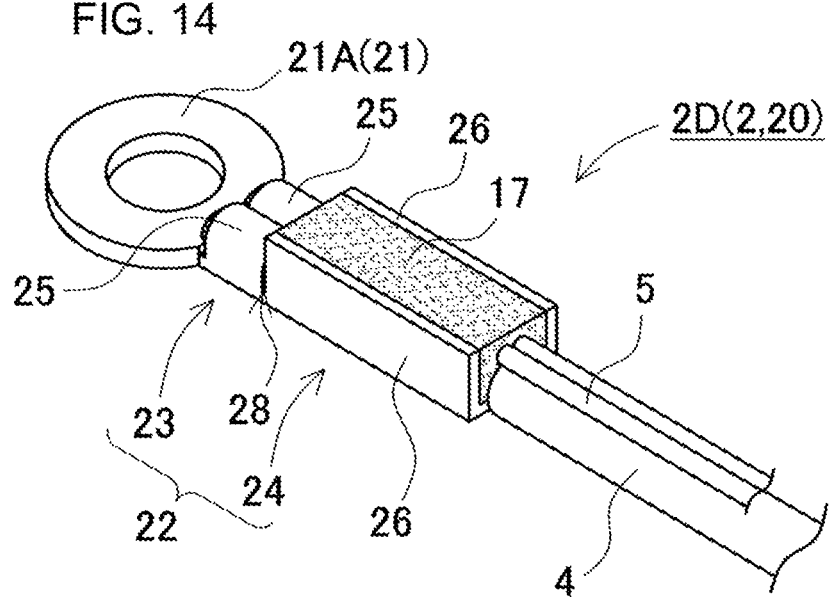
FIG. 14 is a perspective view showing another example of a connecting terminal.
Figure 15:
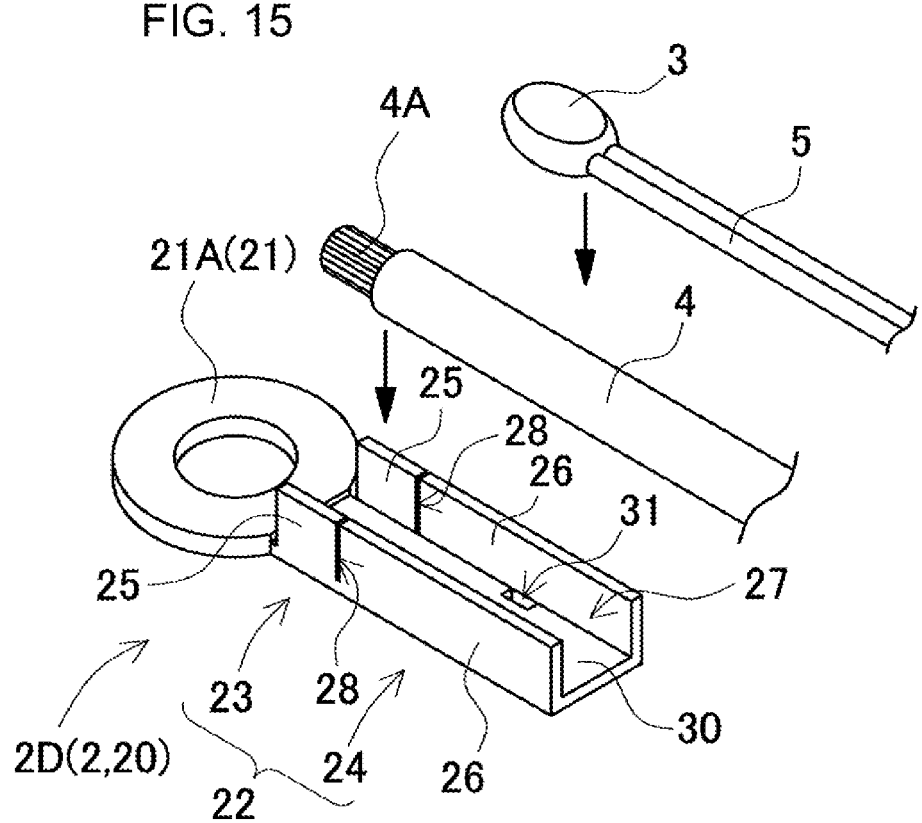
FIG. 15 is an exploded perspective view of the connecting terminal shown in FIG. 14.
Figure 16:
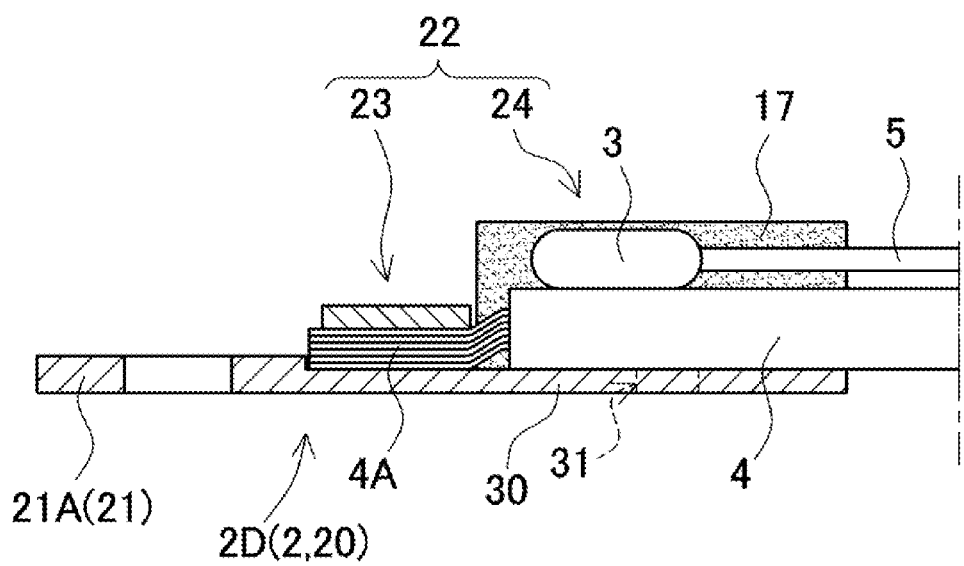
FIG. 16 is a vertical longitudinal sectional view of the connecting terminal shown in FIG. 14.

The connecting terminal 2D of FIG. 14 to FIG. 15 is a crimp terminal 20, and the connecting portion 23 is disposed at the terminal side. This connecting terminal 2D disposes the connecting portion 23 and the fixing portion 24 at the same side, namely at the upper side of the coupling portion 22. The connecting portion 23 and the fixing portion 24 disposed at the same side are separated from each other by providing the cutting line 28 at the boundary therebetween so as not to apply excessive force to the temperature sensor 3 in the process of crimping. In this connecting terminal 2D, after the core wire 4A of the voltage detecting line 4 is crimped by the side walls 25 of the connecting portion 23, the temperature sensor 3 is disposed in the groove 27 of the fixing portion 24, and the groove 27 is filled with the adhesive 17 to fix the temperature sensor 3. The adhesive 17 which fixes the temperature sensor 3 by burying it, fixes also the voltage detecting line 4 together. Thus, this connecting terminal 2D can surly fixes both the temperature sensor 3 and the voltage detecting line 4 by the adhesive 17. The connecting terminal 2D of the figures disposes the connecting portion 23 and the fixing portion 24 at the same side (the upper side in the figures), but the connecting terminal can also dispose the connecting portion and the fixing portion at the opposite sides.

Figure 17:
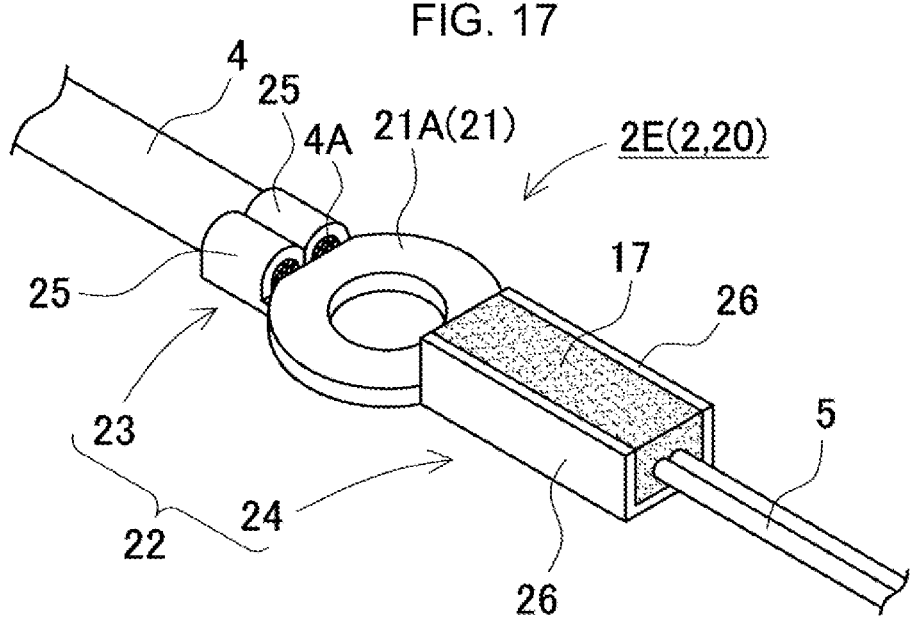
FIG. 17 is a perspective view showing another example of a connecting terminal.
Figure 18:
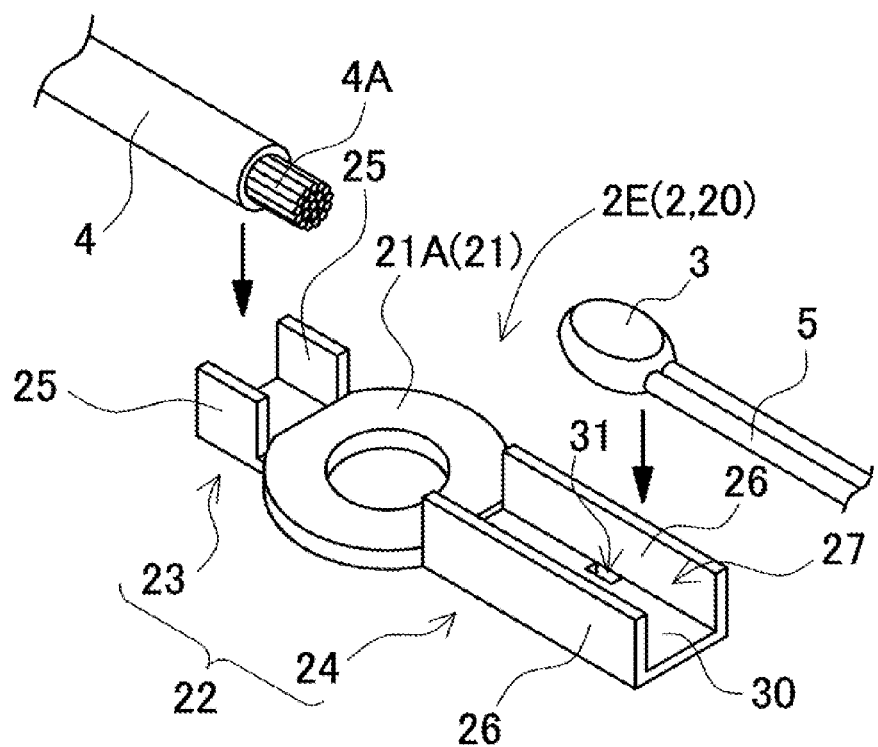
FIG. 18 is an exploded perspective view of the connecting terminal shown in FIG. 17.
Figure 19:
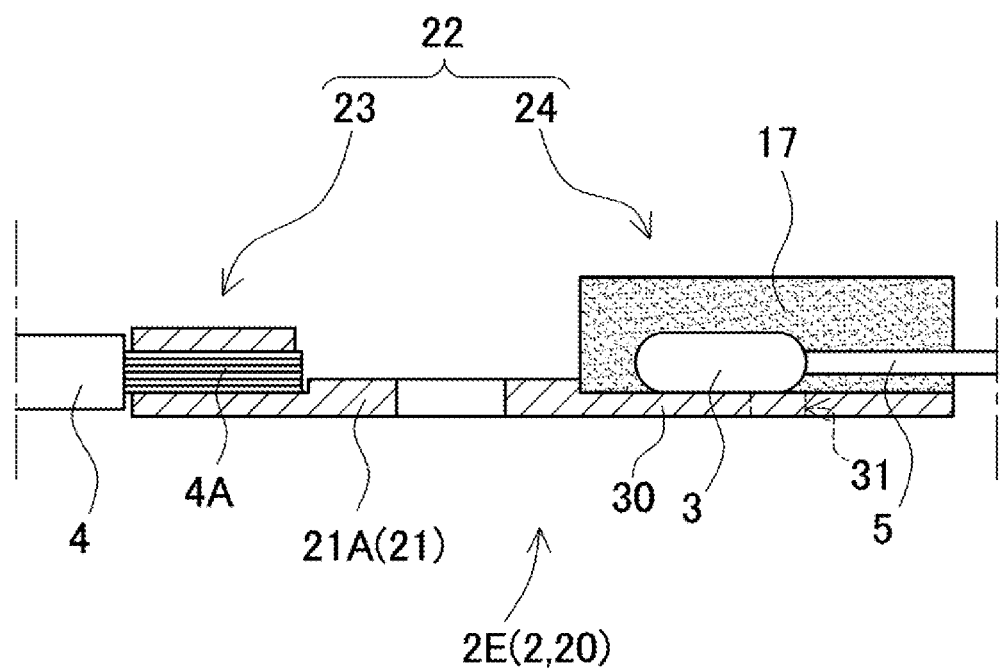
FIG. 19 is a vertical longitudinal sectional view of the connecting terminal shown in FIG. 17.

Further, the connecting terminal 2E of FIG. 17 to FIG. 19 has the ring terminal 21A of the terminal portion 21, and couples the fixing portion 24 and the connecting portion 23 separately in the facing locations at the periphery of the ring terminal 21A. The connecting terminal 2E of this structure fixes the voltage detecting line 4 and the temperature sensor 3 independently, separately. The voltage detecting line 4 is fixed such that the core wire 4A is crimped by the side walls 25 of the connecting portion 23, and the temperature sensor 3 is buried in the adhesive 17 with which a space between the side walls 26 of the fixing portion 24 is filled, and is fixed. The connecting terminal 2 where the fixing portion 24 and the connecting portion 23 are provided at the periphery of the ring terminal 21A, can disposes the fixing portion 24 and the connecting portion 23 at a predetermined angle, and the lead wire 5 of the temperature sensor 3 and the voltage detecting line 4 can be led out in the appropriate directions. Further, the side walls 25 of the connecting portion 23 and the side walls 26 of the fixing portion 24 can be also disposed at the opposite sides, and then the voltage detecting line 4 and the lead wire 5 can be disposed at the upper side and the lower side. The connecting terminal 2E of the figures disposes the connecting portion 23 and the fixing portion 24 at the same side (the upper side in the figures), but the connecting terminal can also dispose the connecting portion and the fixing portion at the opposite sides.

Figure 20:
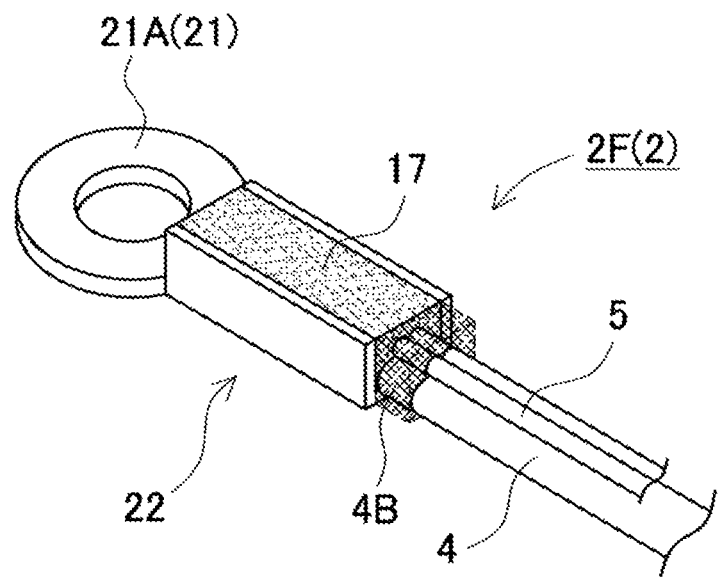
FIG. 20 is a perspective view showing another example of a connecting terminal.
Figure 21:
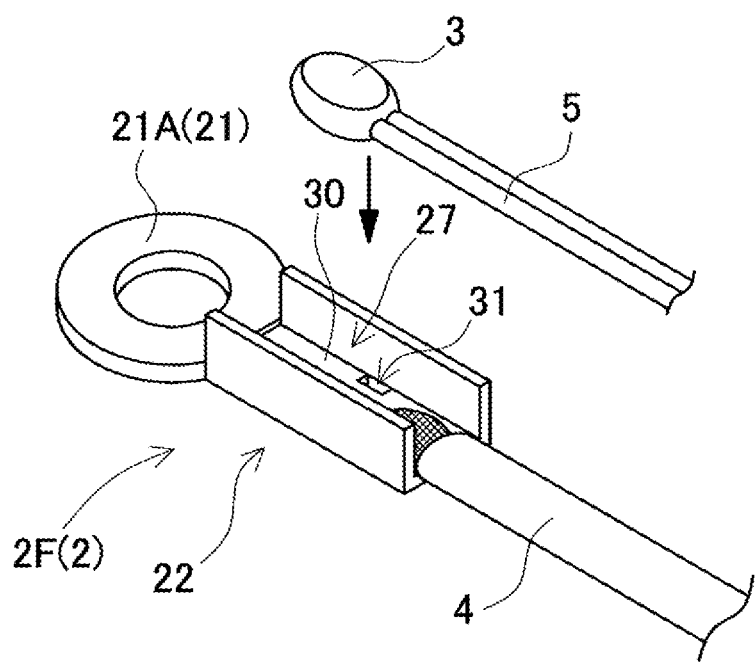
FIG. 21 is an exploded perspective view of the connecting terminal shown in FIG. 20.
Figure 22:
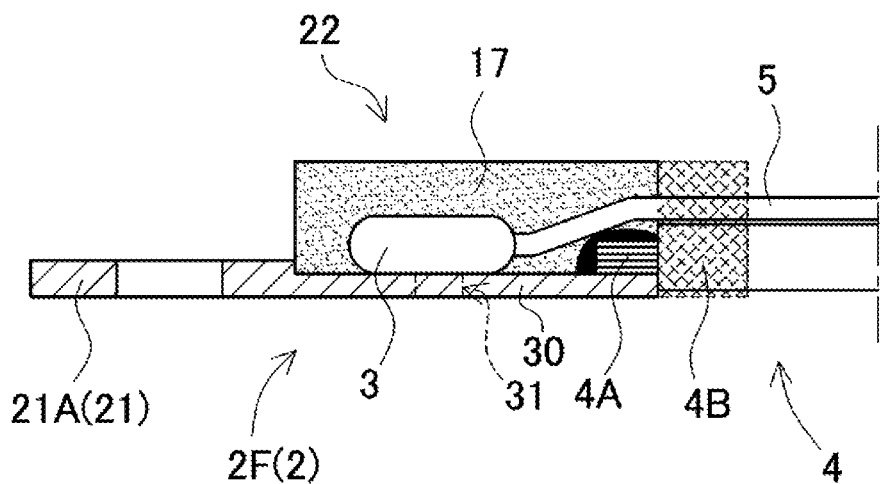
FIG. 22 is a vertical longitudinal sectional view of the connecting terminal shown in FIG. 20.

The connecting terminal 2F of FIG. 20 to FIG. 22 electrically connects the voltage detecting line 4 by welding or soldering without crimping the voltage detecting line 4. This connecting terminal 2F provides the coupling portion 22 having a groove shape at the terminal portion 21, and the core wire 4A of the voltage detecting line 4 is electrically connected by welding or soldering at the rear end portion of the connecting portion 22, and the temperature sensor 3 is fixed to the tip portion of the connecting portion 22, namely at the terminal portion 21 side of the connecting portion 22. After the wire core 4A of the voltage detecting line 4 is electrically connected to the coupling portion 22 by welding or soldering, the temperature sensor 3 is disposed in the groove 27 of the coupling portion 22, and the groove 27 is filled with the adhesive 17 to fix the temperature sensor 3. This connecting terminal 2D can electrically connects the voltage detecting line 4 to the coupling portion 22 by welding or soldering surly and stably in a state of low resistance, and a part of the voltage detecting line 4 can be surely fixed by the adhesive 17 burying the temperature sensor 3. Further, as shown in FIG. 20 and FIG. 22 by using cross-hatched dotted lines, the adhesive 17 with which the coupling portion 22 is filled is extended to the insulating coating portion 4B of the voltage detecting line 4, and the insulating coating portion 4B of the voltage detecting line 4 and the lead wire 5 of the temperature sensor 3 can be buried in the adhesive integrally. In this structure, as the insulating coating portion 4B of the voltage detecting line 4 and the lead wire 5 of the temperature sensor 3 can be fixed in the adhesive integrally, it is reduced that mechanical force is applied to the core wire 4A, and disconnection of lines or contact failure is effectively prevented.

Figure 23:
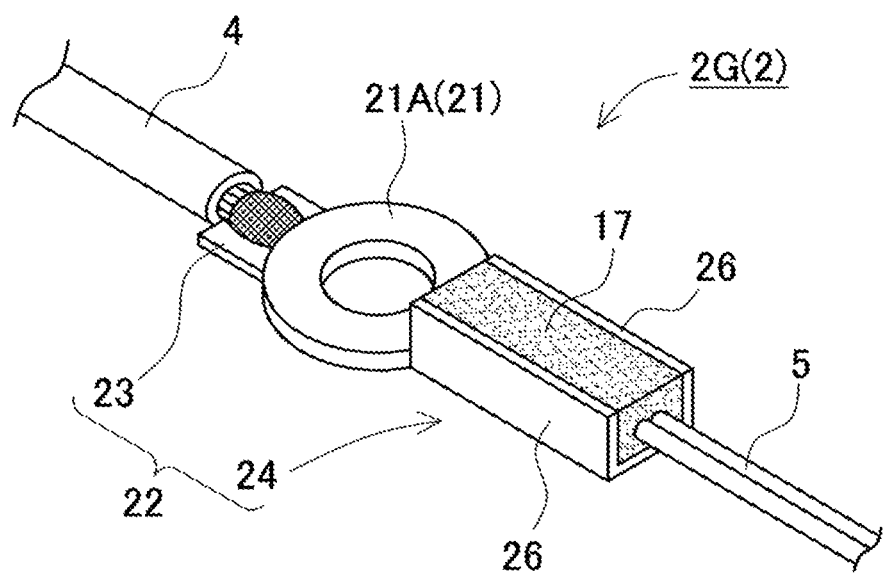
FIG. 23 is a perspective view showing another example of a connecting terminal.

As shown in FIG. 23, the connecting terminal 2 where the voltage detecting line 4 is electrically connected to the coupling portion 22 by welding or soldering, can have a structure where the connecting portion 23 and the fixing portion 24 are separately provided at the periphery of the ring terminal 21A. In this connecting terminal 2G, the connecting portion 23 which is connected to the voltage detecting line 4 by welding or soldering, can be disposed away from the fixing portion where the temperature sensor 3 is fixed. Therefore, in a state where the temperature sensor 3 is fixed, even though the voltage detecting line 4 is welded or soldered, it is prevented that the temperature sensor 3 is heated by the heat of welding or soldering.

Figure 24:
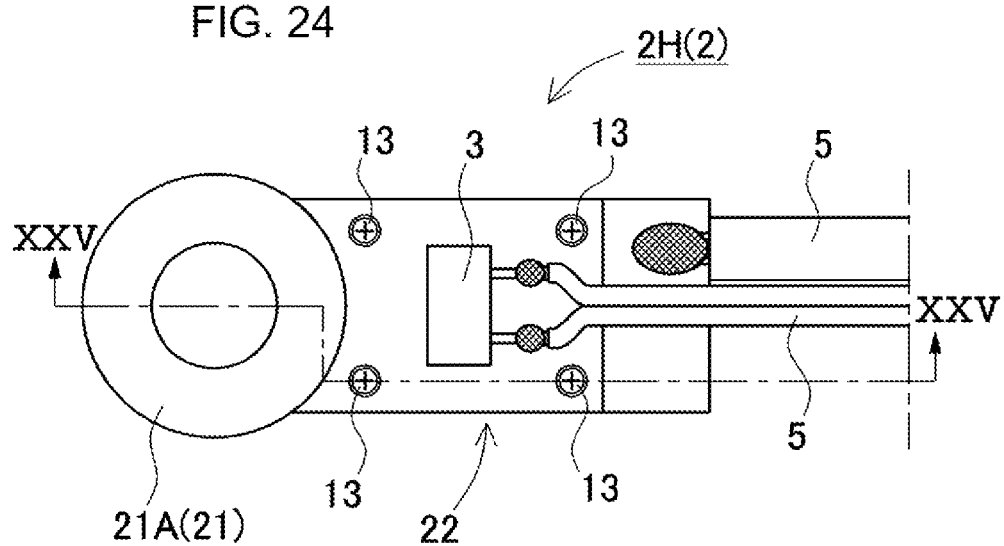
FIG. 24 is a plan view showing another example of a connecting terminal.
Figure 25:
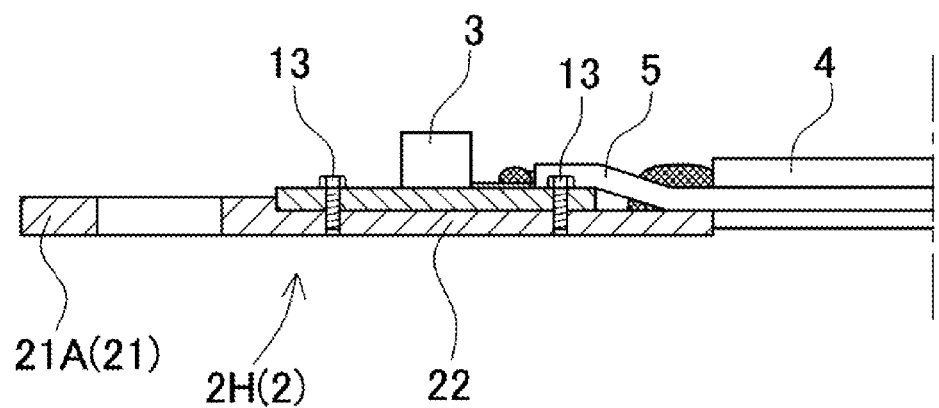
FIG. 25 is a sectional view along a line XXV-XXV of the connecting terminal shown in FIG. 24.

Further, the connecting terminal 2H shown in FIG. 24 and FIG. 25 has plane shapes of the terminal portion 21 and the coupling portion 22. The coupling portion 22 of the plane shape fixes the temperature sensor 3 to the terminal side, and the voltage detecting line 4 at the rear end portion. The plane shape of the bottom surface in the temperature sensor 3 tightly contacts, and is fixed to the surface of the coupling portion 22. The temperature sensor 3 is fixed to the coupling portion 22 with its peripheral portion screwed by the stopper screws 13, or is fixed by adhering. The voltage detecting line 4 is electrically connected to the coupling portion 22 with the core wire 4A soldered or welded. After the voltage detecting line 4 is electrically connected, the connecting terminal 2H fixes the temperature sensor 3, and then it prevents the temperature sensor 3 from being heated by soldering or welding.

Further, in the connecting terminal, the surface mount type thermistor, not shown, can be connected to or mounted on the wiring pattern. This wiring pattern is made by the following steps. An insulating layer made from a paste is coated on the surface of the terminal portion and coupling portion, and its surface is plated with a metal layer, and then the wiring pattern is made by etching. In this connecting terminal, the lead wire is connected by soldering to the wiring pattern which is led from a connecting portion of the thermistor. Then, the voltage detecting line is connected by soldering or welding to the surface of the coupling portion which is not coated with the insulating layer.

Figure 26:
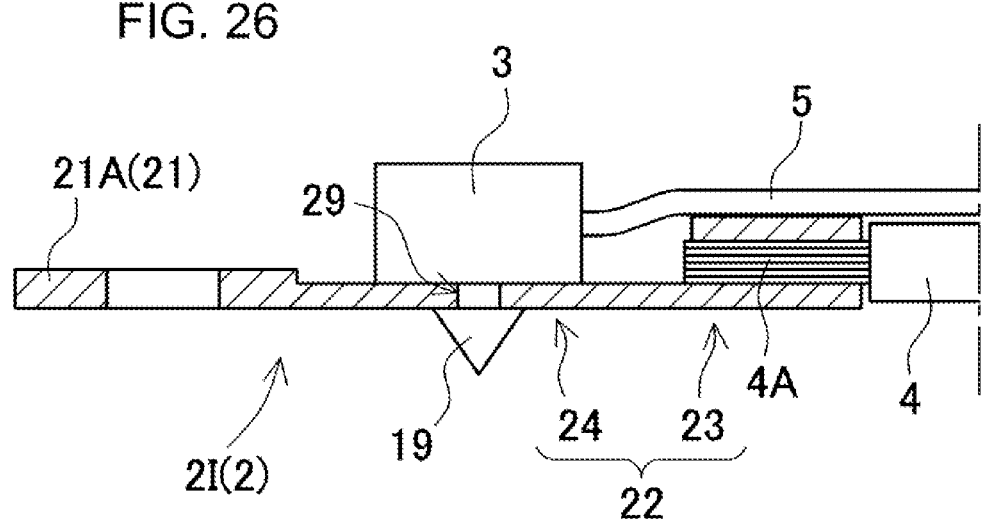
FIG. 26 is a vertical longitudinal sectional view showing another example of a connecting terminal.
Figure 27:
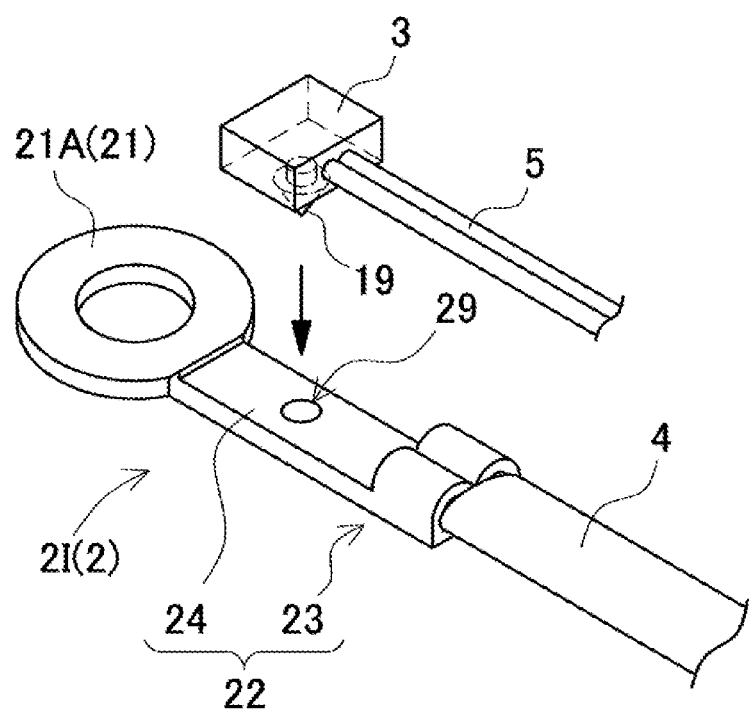
FIG. 27 is an exploded perspective view of the connecting terminal shown in FIG. 26.

The connecting terminal 21 shown in FIG. 26 and FIG. 27 provides a coupling hole 29 at the fixing portion 24 where the temperature sensor 3 is fixed. In this fixing portion 24, a coupling rod 19 of an under cut shape provided at the temperature sensor 3, is inserted into the coupling hole 29, and then the temperature sensor 3 is fixed. To fix the temperature sensor 3 and the fixing portion 24 in a preferable thermal coupling state, the surface of the fixing portion 24 which contacts the temperature sensor 3 is a plane shape, and the facing surface of the temperature sensor 3 to the fixing portion 24 is a plane shape. The coupling rod 19 projects in the direction perpendicular to the facing surface. In this coupling structure, the coupling rod 19 is inserted into the coupling hole 29, and then the temperature sensor 3 tightly contacts the fixing portion 24 in a surface contact state. The connecting terminal 21 of these figures crimps, connects the voltage detecting line 4 to the connecting portion 23.

Figure 28:
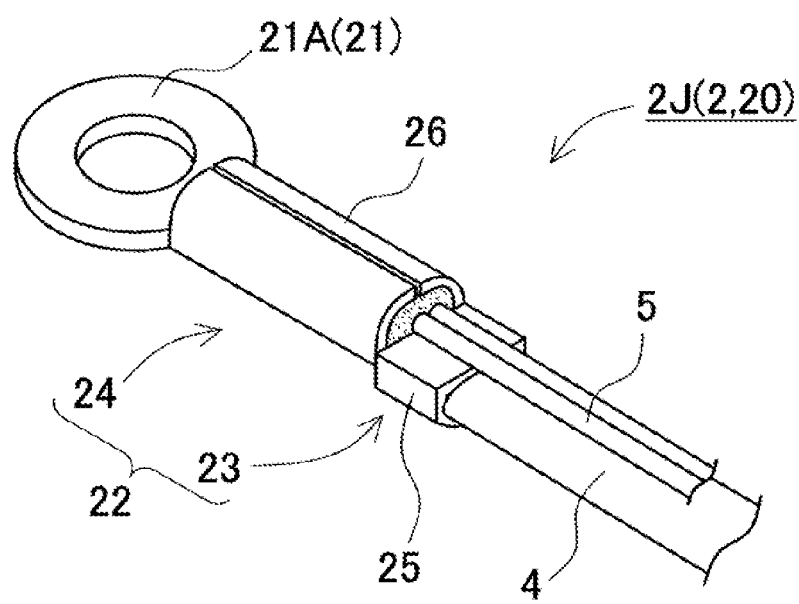
FIG. 28 is a perspective view showing another example of a connecting terminal.
Figure 29:
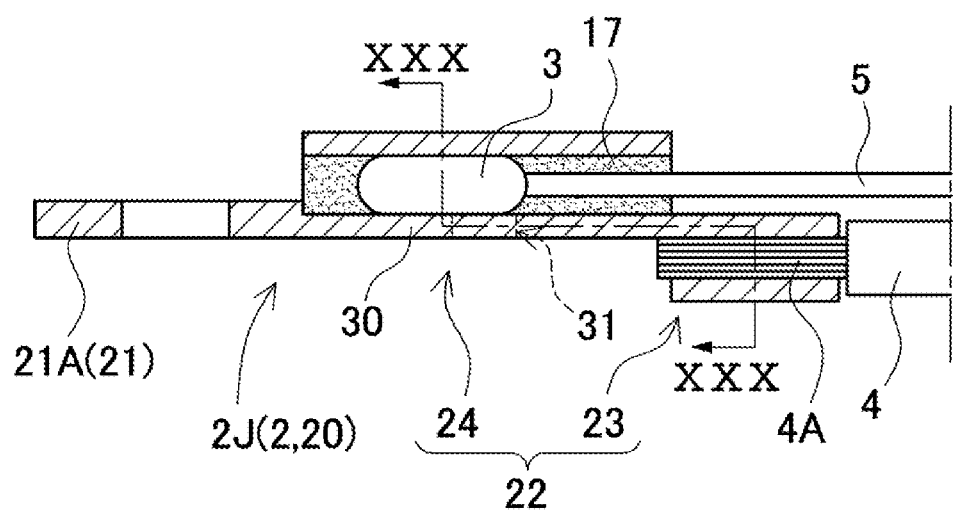
FIG. 29 is a vertical longitudinal sectional view of the connecting terminal shown in FIG. 28.
Figure 30:
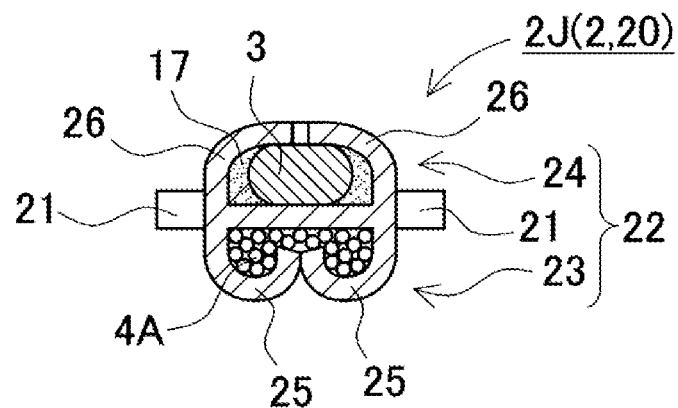
FIG. 30 is a sectional view along a line XXX-XXX of the connecting terminal shown in FIG. 29.

Further, the connecting terminal 2J shown in FIG. 28 to FIG. 30 crimps, fixes the temperature sensor 3 to the fixing portion 24. This connecting terminal 2J disposes the fixing portion 24 and the connecting portion 23 in the longitudinal direction at the coupling portion 22, and fixes the temperature sensor 3 to the fixing portion 24, and connects the voltage detecting line 4 to the connecting portion 23. The fixing portion 24 and the connecting portion 23 provide the side walls 26, 25 projecting in the front and back opposite directions (the upper and down opposite directions in the futures). In the coupling portion 22 shown in the figures, the side walls 26 of the fixing portion 24 project upward, and the side walls 25 of the connecting portion 25 project downward. As shown in a sectional view of FIG. 30, the side walls 26 of the fixing portion 24 fix the temperature sensor 3 in a crimp state by deforming those so as to bend inward. As shown in the sectional view of FIG. 30, the side walls 25 of the connecting portion 23 crimp, electrically connect the core wire 4A of the voltage detecting line 4. This connecting terminal 2J can fix the temperature sensor 3 surely in a thermal coupling state in a long time. In this fixing structure, a space between the temperature sensor 3 and the fixing portion 24 is filled with the adhesive 17 having a thermal conductivity, and then it can improve the thermal coupling state between the temperature sensor 3 and the fixing portion 24.

Here, as the temperature sensor disposed at the fixing portion in this structure, the following type is preferable. After a thermistor element connected to the lead wire is immersed in resin in a fusion state, it is dried. It is a reason why a connecting section between the thermistor element and the lead wire is covered with insulating resin. In this temperature sensor, the connecting section between the thermistor element and the lead wire is not exposed outside, and is an insulating structure against the outside, and then the temperature sensor can be disposed at the connecting terminal while surely preventing short circuit to the voltage detecting line.

Figure 31:
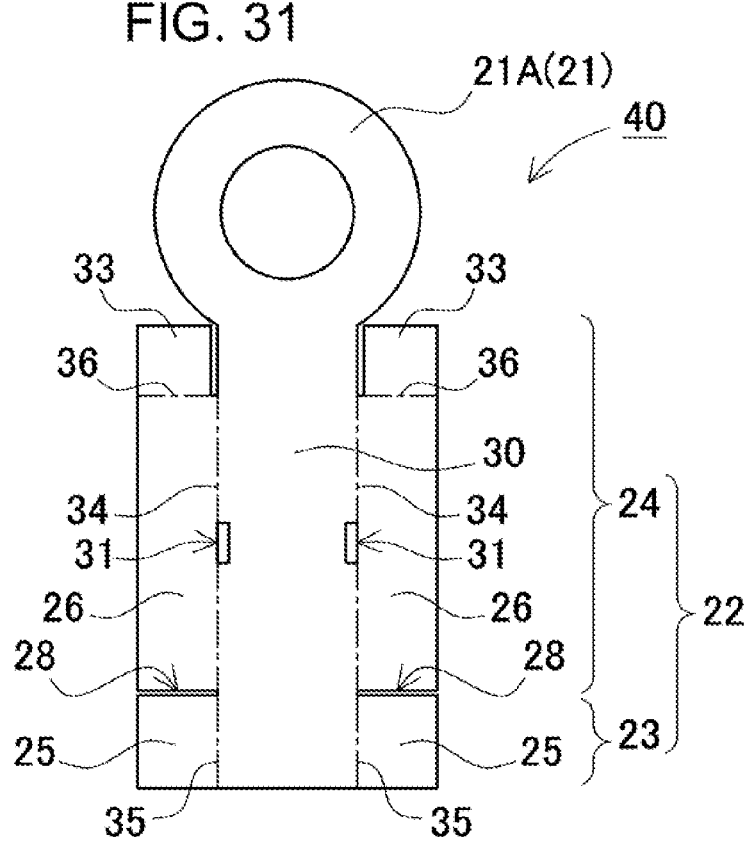
FIG. 31 is a plan view of one example of a cutting pattern of a metal board forming a connecting terminal.

In the above connecting terminal 2, for example, after a sheet of a metal board is cut in a predetermined shape, the fixing portion 24 or the connecting portion 23 is formed by bending process. One example of such a cutting pattern 40 of the metal board is shown in FIG. 31. In the cutting pattern 40 of the metal board shown in this figure, the terminal portion 21 is coupled to one short side of a rectangle as the bottom surface 20 of the coupling portion 22, and the side walls 26 and the side walls 25 are coupled to both long sides of the rectangle, facing each other. The cutting lines 28 are provided between the side walls 26 and the side walls 25 which are adjacent to each other. Further, bending boards 33 are coupled to the pair of the side walls 26 at one end of the terminal portion 21 side. The through holes of the air releasing holes 31 are opened in the middle portions at the boundary between the bottom surface 30 of the rectangle and the side walls 26.

The connecting terminal 2 is formed from the above cutting pattern 40 in the following way.

(1) The bottom surface 30 of the rectangle and the side walls 26 of both sides are bent along bending lines 34 at the boundary therebetween in a predetermined direction (for example, a valley fold), and then the groove 27 is formed between the facing side walls 26.

(2) The bottom surface 30 of the rectangle and the side walls 25 of both sides are bent along bending lines 35 at the boundary therebetween in a predetermined direction. When the side walls 25 are bent in the same direction (a valley fold) as the side walls 26, the fixing portion 24 and the connecting portion 23 are formed at the same side among the front or the back. When the side walls 25 are bent in the opposite direction (a mountain fold) to the side walls 26, the fixing portion 24 and the connecting portion 23 are formed at the opposite sides among the front or the back.

(3) The bending boards 33 of the side walls 26 bent to the bottom surface 30 are bent inward (a valley fold) along bending line 36, and then an opening portion of the groove 27 as the fixing portion 24 is closed. In this structure, the bending boards 33 effectively prevent the adhesive with which the groove 27 of the fixing portion 24 is filled from flowing out.

Here, preferably, in the above cutting pattern 40, the plural pieces are continuously coupled in a state of members of a reel shape, and bending along the bending lines 34, 36 is carried out in a step, and by bending along the bending lines 35, the side walls 25 crimp the voltage detecting line 4 in another step. Then, after the temperature sensor 3 is fixed to the fixing portion 24 by the adhesive 17, the connecting terminal 2 is cut off from the members of the reel shape. Instead, after the connecting terminal 2 is cut off from the members of the reel shape, the temperature sensor 3 is fixed to the fixing portion 24 by the adhesive 17. By such a manufacturing method, manufacturing processes can be automated, and then manufacturing cost can be reduced.

The above battery system can be used as a power source for a vehicle. As the vehicle incorporating the battery system, electric vehicles such as hybrid cars or plug-in hybrid cars that are driven by both an engine and an electric motor, or pure electric vehicles that are driven only by an electric motor, can be used. The battery system is used as power sources of these vehicles.

INDUSTRIAL APPLICABILITY

The battery system of the present invention can be suitably used in electric vehicles such as pure electric vehicles, hybrid electric vehicles, or the like, or electric power storage devices for storing natural energy such as solar cell power generation or wind power generation, or midnight electric power energy.

The invention claimed is:

1. A battery system comprising:
    an assembled battery in which a plurality of battery cells are connected in series;
    a voltage detecting line for detecting voltage of the battery cells constituting the assembled battery; and
    a temperature sensor for detecting temperature of at least one of the battery cells constituting the assembled battery,
    wherein the assembled battery has a voltage detecting location to which the voltage of the battery cells detected by the voltage detecting line is applied, and the voltage detecting location is thermally coupled to an electrode terminal of at least one of the battery cells,
    the voltage detecting line has a connecting terminal provided at one end, and the connecting terminal is fixed at the voltage detecting location,
    the temperature sensor is provided at the connecting terminal, and is fixed to the connecting terminal in a thermally coupled state,
    wherein the connecting terminal is made of a metal board for electrically connecting the voltage detecting line to the voltage detecting location, the connecting terminal comprising:
        a terminal portion for fixing the connecting terminal to the voltage detecting location;
        a connecting portion physically connecting the connecting terminal to the voltage detecting line; and
        a fixing portion fixing the temperature sensor directly to the connecting terminal.

2. The battery system according to claim 1,
    wherein the temperature sensor is fixed to the connecting terminal in an electrically isolated condition.
3. The battery system according to claim 1,
    wherein the assembled battery has a plurality of bus bars connecting the electrode terminals of the plurality of the battery cells, and
    the voltage detecting location is provided on at least one of the plurality of the bus bars.
4. The battery system according to claim 1,
    wherein the temperature sensor is fixed to the connecting terminal by any one of structures of adhering, crimping, and engaging.
5. The battery system according to claim 1,
    wherein the connecting terminal is a crimp terminal, and the crimp terminal comprises a coupling portion which electrically connects the voltage detecting line and fixes the temperature sensor, and the terminal portion, which is connected to the electrode terminal,
    the coupling portion has a groove made by bending a metal board, and comprises the connecting portion and the fixing portion,
    the connecting portion has both side walls bent to keep crimp connection of the voltage detecting line, and
    the fixing portion disposes the temperature sensor in the groove, and fixes the temperature sensor with an adhesive filled in the groove.
6. The battery system according to claim 5,
    wherein the connecting portion which crimp-connects the voltage detecting line, and the fixing portion which disposes and fixes the temperature sensor in the groove, are disposed in the coupling portion along a longitudinal direction.
7. The battery system according to claim 6,
    wherein the connecting portion and the fixing portion are disposed on opposite sides, i.e. an upper surface and a back surface, or a same side of the coupling portion.
8. The battery system according to claim 6,
    wherein the fixing portion is disposed closer to the terminal portion than the connecting portion.
9. The battery system according to claim 5,
    wherein the terminal portion is a ring terminal having an annular shape.
10. The battery system according to claim 5
    wherein the connecting terminal is a crimp terminal having the ring terminal at the terminal portion, where the fixing portion and the connecting portion are coupled separately in a circumferential direction from a periphery of the ring terminal.
11. The battery system according to claim 1,
    wherein the fixing portion is provided with a coupling hole, and the temperature sensor is provided with a coupling rod such that the temperature sensor is fixed to the fixing portion with the coupling rod inserted in the coupling hole.
12. The battery system according to claim 1, wherein the connecting terminal is an integral one piece structure.

* * * * *